April 14, 1953     E. R. SLINKMAN     2,635,001
PLANT ROOT PULLER
Filed Nov. 9, 1946     2 SHEETS—SHEET 1
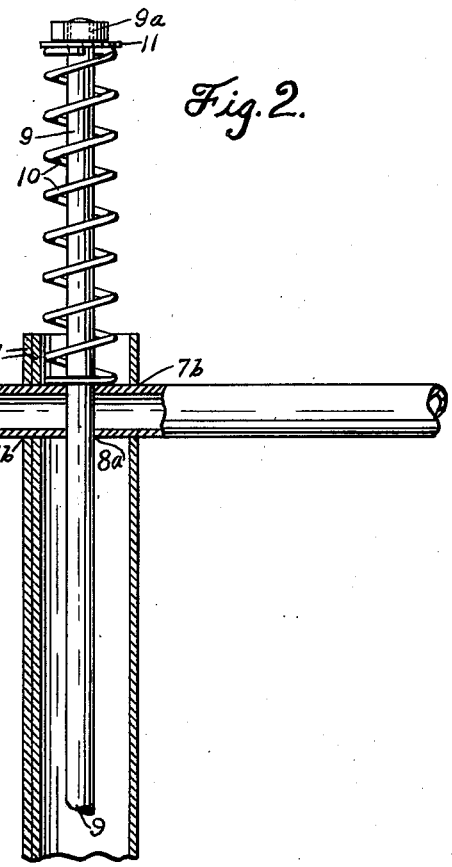
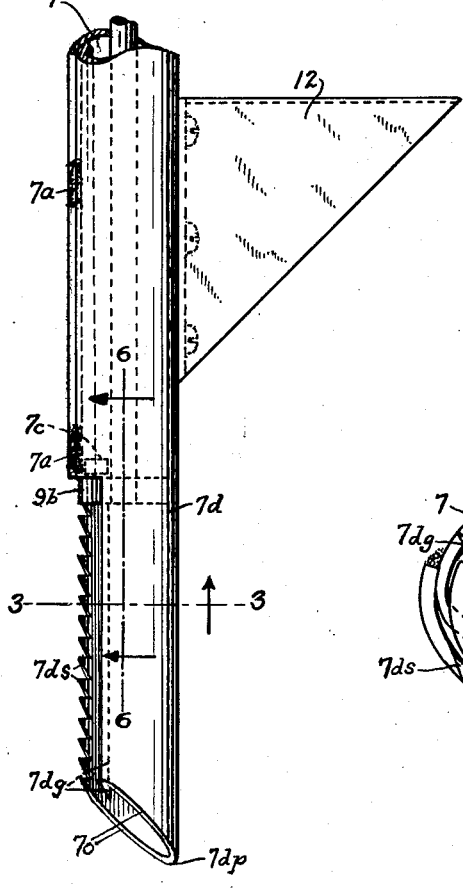
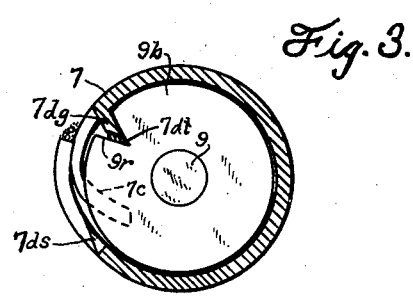
INVENTOR,
E. R. SLINKMAN.
BY
Sterling P. Buck.

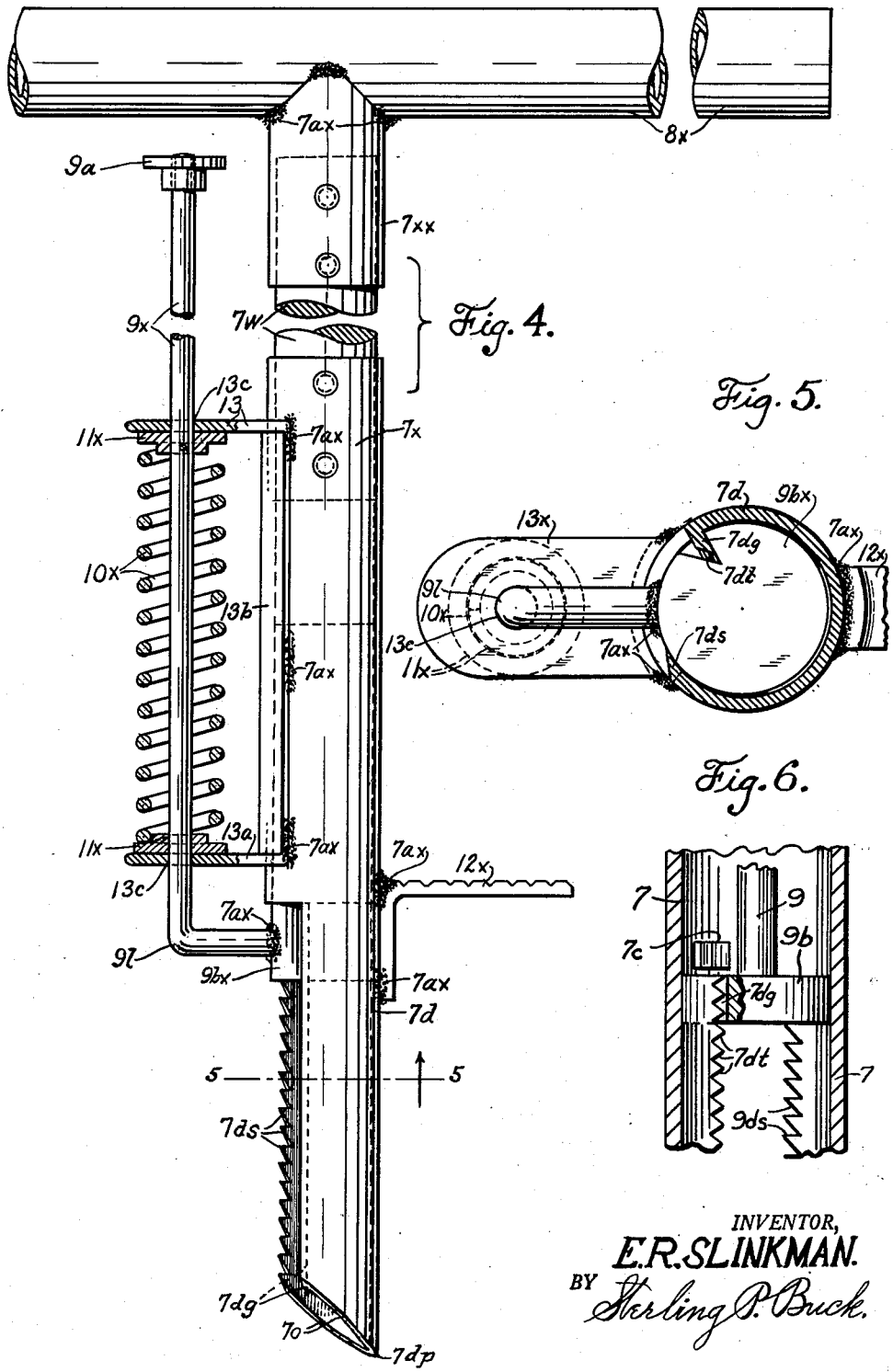

Patented Apr. 14, 1953

2,635,001

UNITED STATES PATENT OFFICE 2,635,001

PLANT-ROOT PULLER

Edward R. Slinkman, Baltimore, Md.

Application November 9, 1946, Serial No. 709,075

7 Claims. (Cl. 294—50.5)

This invention relates to plant-root pullers, and is especially applicable to the pulling of small plants, including weeds and the roots thereof.

One of the objects of this invention is to provide a very practical and effective device that cuts and breaks lateral roots while surrounding the main root or tap-root; then by an upward pull, removes the main root with dirt that surrounds the main root; next, by operating a plunger, ejects the root and dirt intact; so, if desired to transplant the plant, the adhering dirt facilitates its growth when transplanted.

Another object of this invention is to provide an improved spud that will not pack the ground around a spudded cavity in which a plant is to be transplanted, and which will eject dirt into the cavity after the plant-root is placed therein.

A further object is to provide a device of this character that is thoroughly practical and easily operated by any person of ordinary ability, without unduly stooping, and in which there are co-operative hand-operating and foot-operating elements that render the device easily operated.

Other objects and important features are pointed out and implied in the following details of description in connection with the accompanying drawings in which:

Figure 1 is a view in side elevation, intermediate parts of the main body and plunger being broken out.

Fig. 2 is a fragmental section detail assembly of the upper end-portion of the device shown in Fig. 1, viewed at right angles to the line of vision of Fig. 1.

Fig. 3 is an enlarged cross-sectional view taken on line 3—3 of Fig. 1.

Fig. 4 is a view in side elevation, of a modified form of this invention, parts of the body, handle and plunger being broken away, parts at left being in vertical section.

Fig. 5 is an enlarged sectional view taken along the line 5—5 of Fig. 4.

Fig. 6 is a central vertical sectional view along line 6—6 of Fig. 1.

Referring to these drawings in detail, in which similar reference characters refer to similar parts in the several views, the invention is described in detail as follows:

In Figs. 1, 2 and 3, the main body 7 is shown as a tube formed from a blank of sheet-metal and spot-welded at 7a to increase its rigidity. Its upper end portion is apertured at 7b and has a tubular handle-bar 8 fitted therein. The handle-bar 8 is apertured at 8a to provide a bearing for the plunger-rod 9 to slide in; and the plunger-rod is united with a plunger-head 9a and a plunger-foot 9b. A helical compression-spring 10 surrounds the upper end of the rod 9 and has its upper end under a washer 11 which is against the head 9a, while its lower end is seated on the handle-bar within the upper end of the main body 7. The plunger-foot 9b is normally held up against a shoulder 7c, as in Figs. 1, 3 and 6, at position shown in Fig. 1, by co-operation of the elements 7, 8, 9, 10, 11, and 9a, and is slideable to the lower end-portion of the ground-piercing end-portion 7d. The ground-piercing portion 7d also includes a serrated edge 7ds, and an inwardly turned guide-flange 7dg; and the foot 9b is recessed at 9r to receive this flange 7dg and slide therealong. The flange 7dg is provided with any appropriate number of dual-purpose teeth 7dt to cut or break lateral roots that are not reached by the teeth or serrations 7ds, and to clean out the notch or recess 9r with each operation of the plunger-foot 9b, so the latter will continue to work easily under downward pressure of the operator and upward pressure by spring 10. The main purpose of this flange 7dg is to carry with it the dirt and plant-root when the operator turns the device contra-clockwise, while the end-portion 7d is in place around the plant-root, thereby twisting and loosening any part of the plant-root that may be below the lower end of the device.

The lower extremity of the device is oblique, as seen at 7o, and terminates in the acute entering point 7dp, enabling it to be forced into hard ground with comparative ease; but to make it easier, a laterally extending tread-element 12 is provided to receive a foot of the user for exerting downward pressure to cooperate with pressure of the user's hands on the handle or handle-member 8 for distributing the user's weight and strength on the device.

In the modified form of Figs. 4 and 5, parts having similar functions and a slightly different shapes have same reference-characters with only a letter x added. The main body comprises tubular parts 7x, 7xx and 8x, the latter being the handle-member and united with part 7xx by spot-welding 7ax which also applies to the several spot-welds shown. Tubular sections 7x and 7xx are united by a wooden shank 7w of any appropriate length, the lower and upper ends of this shank being fitted and secured in the lower and upper ends of parts 7x and 7xx respectively. A bracket is welded on the tubular part 7x and comprises an upper bearing-arm 13, a lower bearing-arm 13a and an intermediate part 13b. Each bearing-arm has a bearing-aperture 13c therethrough; and the plunger-rod 9x is slidingly seated therein, and has its upper end provided with a plunger-head 9ax; its lower end being formed with an L-bend 9l that is welded to the foot 9bx. A washer or collar 11x is united with the rod 9x against which the upper end of compression-spring 10x is seated while the lower end of this spring is seated on a similar washer 11x through which the rod 9x is slideable, as through the openings 13c.

The operation of both forms of this invention is substantially the same, as follows:

The device may be first held in a slightly inclined or oblique position and moved so the stalk of the plant passes between serrated and inturned edges 7s and 7dg; then, when the point 7dp begins to enter the ground, the device is straightened up to near vertical position while the part 7d is being pressed farther into the ground; then when it is sufficiently pressed in, the handle-member is turned once-around, contra-clockwise, then raised from the ground; and next, the handle-member is held with one hand while the other hand is placed on the head 9a or 9ax and pressed down for causing the rod 9 or 9x to slide the foot or ejector 9b or 9bx to its lowermost posiiton, thereby ejecting the raised dirt and plant-root.

I have no intention to limit my patent protection to the precise detail of construction and arrangement as described in the foregoing and as shown in the drawings, for this invention is susceptible of numerous changes within the scope of the inventive ideas as implied and claimed.

My invention is claimed as follows:

1. In a root-puller, a main body that is substantially tubular and includes a ground-piercing end-portion provided with a normally upright serrated edge and an oblique lower end which latter terminates in an acute entering point, in combination with means to force the ground-piercing portion into the ground that is around a plant-root and to impart rotary and upward movements thereto for causing the serrated portion to sever lateral plant-roots and assist in raising the main plant-root with dirt that surrounds the latter, and ejecting means including a plunger-foot that is slideable in said ground-piercing portion to eject said root and dirt, the interior of said ground-piercing portion being provided with a ground-engaging flange in spaced substantially parallel relation to said serrated edge for causing the dirt around said plant-root to rotate with said ground-piercing portion and thereby cause said dirt to assist in twisting and pulling the plant-root out of the ground.

2. In a root-puller, a main body that is substantially tubular and includes a ground-piercing end-portion that is provided with a normally upright serrated edge and an oblique lower end which latter terminates in an acute point, in combination with means to force the ground-piercing portion into the ground that is around a plant-root and to impart rotary and upward movements thereto for causing the serrated portion to sever lateral plant-roots and assist in raising the main plant-root with the dirt that surrounds the latter, and ejecting means including a plunger-foot that is slidable in said ground-piercing portion to eject said root and dirt, the interior of said ground-piercing portion being provided with a ground-engaging flange in spaced substantially parallel relation to said serrated edge for causing the dirt around said plant-root to rotate with said ground-piercing portion and thereby cause said dirt to assist in twisting and pulling the plant-root out of the ground, said plunger-foot having a notch to receive said flange and slide therealong, said flange being provided with at least one tooth for dislodging dirt from said notch, thereby to facilitate easy operation of said root-puller.

3. A root-puller that includes a substantially tubular main body that has a tubular ground-piercing portion adapted to be pushed into the ground around a plant-root and raised and thereby to lift the plant-root and the surrounding dirt, in combination with an ejector that includes a plunger-rod which has a portion within said tubular body and a portion extending upward from within the latter, the upper part of said tubular body having openings in its opposite sides, a handle-bar having a bearing through its middle portion and being seated in said openings with its bearing between said openings, said plunger-rod being seated in said bearing so as to be slideable therein to secure said handle-bar in its seat.

4. The combination defined by claim 3, a plunger-head secured on the upper end of said plunger-rod, and a spring compressed between said head and said handle-bar and adapted to yield for permitting said ejector to be lowered and for raising said ejector to its uppermost position.

5. In the combination defined by claim 3, said handle-bar being united with the upper end-portion of said main body and projecting laterally therefrom for convenient manipulation in turning said main body while pressing down on same, and a tread-element on and near the lower end of said main body to receive downward pressure from a foot of the user to co-operate with said handle-bar for pushing said ground-piercing portion into the ground.

6. A plant-root-puller comprising an integral body that includes a tubular main upper portion and a substantially tubular ground-piercing lower end-portion, means on said main upper portion to enable a user to push said ground-piercing portion into the ground and to raise it from the ground with dirt therein, an ejector or plunger-foot slideably seated in said ground-piercing portion and against all inner sides thereof and operable to eject said dirt from said ground-piercing portion, an upper bearing and a lower bearing united with the exterior of said tubular main portion, a plunger-rod slideably seated in and extending through said upper bearing and lower bearing and having its lower end connected to said ejector-foot and having its upper end in convenient position to be pushed down for lowering said ejector-foot, and a spring around said plunger-rod and having its upper end connected to the latter while its lower end is seated on said lower bearing for co-operation in raising said ejector-foot to the upper end of said ground-piercing portion.

7. In a plant-root puller, the combination of a main body that includes a substantially tubular portion whose lower extremity is sharp and open and adapted to be pushed into the ground for receiving a plant-root and the dirt that surrounds the plant-root thereinto, said substantially tubular portion having therein a ground-engaging flange extending along its inner surface to prevent rotation of said root and dirt relative to the tubular portion, means on said tubular portion to receive and transmit force from a user for pushing the tubular portion into the ground, and means united with said tubular portion to eject said plant-root and dirt from said tubular portion when the latter is retracted from the ground.

EDWARD R. SLINKMAN.

References Cited in the file of this patent

UNITED STATES PATENTS

| Number | Name | Date |
|---|---|---|
| 565,745 | Harris | Aug. 11, 1896 |
| 588,833 | Overbey | Aug. 24, 1897 |
| 969,701 | Jaynes | Sept. 6, 1910 |
| 1,121,615 | Day | Dec. 22, 1914 |
| 1,169,921 | Burns | Feb. 1, 1916 |
| 1,952,585 | Croasdale, Jr. et al. | Mar. 27, 1934 |
| 2,030,770 | Smith | Feb. 11, 1936 |
| 2,282,673 | Peterson | May 12, 1942 |

FOREIGN PATENTS

| Number | Country | Date |
|---|---|---|
| 296,139 | Great Britain | Aug. 30, 1928 |